United States Patent
Van Dalfsen et al.

(10) Patent No.: US 7,564,453 B2
(45) Date of Patent: Jul. 21, 2009

(54) METHOD OF REGULATING OUTPUT PARAMETERS OF A POWER SUPPLY

(75) Inventors: Age Jochem Van Dalfsen, Eindhoven (NL); Eric Peter Funke, Eindhoven (NL); Cornelis Teunissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 764 days.

(21) Appl. No.: 10/498,963

(22) PCT Filed: Dec. 18, 2002

(86) PCT No.: PCT/IB02/05628

§ 371 (c)(1),
(2), (4) Date: Jun. 16, 2004

(87) PCT Pub. No.: WO03/055032

PCT Pub. Date: Jul. 3, 2003

(65) Prior Publication Data

US 2005/0013064 A1    Jan. 20, 2005

(30) Foreign Application Priority Data

Dec. 21, 2001  (EP) .................................. 01205127

(51) Int. Cl.
*G09G 5/00* (2006.01)

(52) U.S. Cl. .................. 345/211; 345/60; 345/204; 345/212; 345/215

(58) Field of Classification Search ............ 345/76, 345/60–69, 81–104, 204–215
See application file for complete search history.

(56) References Cited

U.S. PATENT DOCUMENTS

| 4,820,023 A | * | 4/1989 | Ohsawa ............... 396/301 |
| 5,093,654 A | * | 3/1992 | Swift et al. ............. 345/76 |
| 6,225,783 B1 | | 5/2001 | Nagano et al. |
| 6,633,287 B1 | * | 10/2003 | Yatabe et al. ........... 345/211 |

FOREIGN PATENT DOCUMENTS

| JP | 08314407 A | 11/1996 |
| WO | WO0079673 A1 | 12/2000 |

* cited by examiner

*Primary Examiner*—Vijay Shankar

(57) ABSTRACT

The present invention relates to a method, load (12) and display device (10) where an output parameter value (V) of a power supply (14) coupled to a separate load (12) is regulated. The load (12) demands at least one such parameter value (V) from the power supply (14). The power supply (14) delivers the output parameter value (V) to the load (12). The load (12) comprises a control signal setting unit (16), which receives information relating to the output parameter value (V) and is connected to the power supply (14) for delivering a control signal (VC). The control signal (VC) includes information relating to the output parameter value (V) and is used by the power supply (14) for regulating the output parameter value (V). This makes the control signal setting unit (16) part of a feedback loop. The parameter value is preferably an output voltage, the load a plasma display panel and the display device a television set.

9 Claims, 4 Drawing Sheets

METHOD OF REGULATING OUTPUT PARAMETERS OF A POWER SUPPLY

TECHNICAL FIELD

The present invention relates to the field of power supplies for electrical loads.

DESCRIPTION OF RELATED ART

There has in recent years been a development of load devices, which have more severe requirements on the voltages and/or currents delivered to them in order to function properly. One such device is a plasma display panel.

A plasma display panel (PDP) requires accurate voltage levels from a power supply device for the sustain voltage and the addressing voltage used in the display. A current system consists of two methods: According to a first method the PDP delivers two different reference voltages ranging between 0 and 2 V, to be used for controlling sustain and addressing voltages. The power supply device then has to deliver output values derived from these reference voltages via a predefined formula. Another method suggests that required sustain and addressing voltages are printed on a sticker on the PDP. These values can then be used by a set maker to calibrate their power supply device. In all cases it is a requirement that the voltages delivered to the PDP remain within certain limited error margins during the entire lifetime of the PDP.

In some power supply devices of today these specified error margins can in many cases be hard to live up to. Also the use of the sticker poses problems, such as: calibration of the power supply device using the sticker value cannot be done before assembly of the total monitor, so it would have to be done after assembly. After assembling the monitor, it is often impossible to calibrate the power supply device, since, for example, the sustain and addressing voltages cannot be reached anymore, so they cannot be measured.

JP 08-314407 describes, according to a first aspect, a feedback loop between a power supply device and a load, which is a plasma display panel. In this device a delivered voltage is fed back from the plasma display to the power supply device. The voltage delivered back is however a status voltage. This voltage signals the start of delivery of power after a certain delay. The delay is either provided by a delay circuit in the power supply device or a delay circuit in the load. The device is provided in order to suppress malfunction when turning on the power source. According to a second aspect there is described use of the status voltage when turning off the power. However according to this aspect there is no feedback loop provided between load and power supply. The status voltage is here used for suppression of malfunctioning when turning off the load. There is no mention of relaxing error margins of supply voltages.

There is thus a need for a solution, which removes the problem of tight error margins in voltages delivered by a power supply to a load.

SUMMARY OF THE INVENTION

It is an object of the present invention to provide a method by which the problem of tight error margins are reduced when delivering voltages to a load.

This object is, according to a first aspect, achieved by a method of regulating an output parameter value of a power supply device coupled to a separate load device which demands at least one certain parameter value from the power supply device, the method comprising the steps of: delivering a control signal from the load device to the power supply device, regulating the output parameter value in the power supply device in dependence on the delivered control signal, and delivering the regulated output parameter value to the load device. The control signal includes information relating to the output parameter value, so that a feedback loop is provided between load device and power supply device.

Another object of the present invention is to provide a load device by which the problem of tight error margins are removed when delivering voltages to the load device, which has certain requirements concerning the error margins.

This object is, according to a second aspect, achieved by a load device demanding at least one certain parameter value output from a separate power supply device and comprising, a control signal setting unit arranged to receive information relating to an output parameter value delivered by the power supply device and connectable to a control input of the power supply device, for delivering a control signal for use in regulating the output parameter value of the power supply device, such that the control signal setting unit is part of a feedback loop.

Yet another object of the present invention is to provide a display device including a load device, by which the problem of tight error margins are removed when delivering voltages to the load device, which has certain requirements concerning the error margins.

This object is according to a third aspect achieved by a display device including a load device connected to a power supply device. The load device demands at least one certain parameter value output from a separate power supply device and comprises a control signal setting unit arranged to receive information relating to an output parameter value delivered by the power supply device and having an output for delivering a control signal. The power supply device comprises an input connected to the output of the control signal setting unit for receiving the control signal, a power delivery unit for supplying an output parameter value to the load device, and a control unit for regulating the output parameter value in dependence on the control signal. The load device and power supply device are separate entities and the control signal setting unit is part of a feedback loop between the two entities.

The invention according to the above mentioned aspects has the following advantages. It enables the provision of a cheaper power supply device because of the less stringent error margins. Another advantage is that a more accurate output voltage is delivered, which results in, when the load for instance is a plasma display panel (PDP), an optimal picture quality for the PDP during the lifetime of the product in which the PDP is provided. Moreover, it becomes possible to eliminate the alignment of the output voltage of the power supply device, which reduces the costs of manufacturing.

The dependent claims define advantageous embodiments.

The measure as defined in claim 5 and 6 has the advantage that less or simpler adjustments are necessary in a factory where a power supply device and a load are assembled.

The basic idea behind the invention is to provide a closed control loop between load device and power supply device, where information regarding a parameter value delivered from the power supply device is included.

These and other aspects of the invention will be apparent from and elucidated with reference to the embodiments described hereinafter.

BRIEF DESCRIPTION OF THE DRAWINGS

The present invention will now be explained in more detail in relation to the enclosed drawings, where.

DETAILED DESCRIPTION OF EMBODIMENTS

The present invention relates generally to load devices having special requirements on the power supply. The present invention also relates to a display device having such a load device as well as a method of regulating a power supply device.

Figure 1:
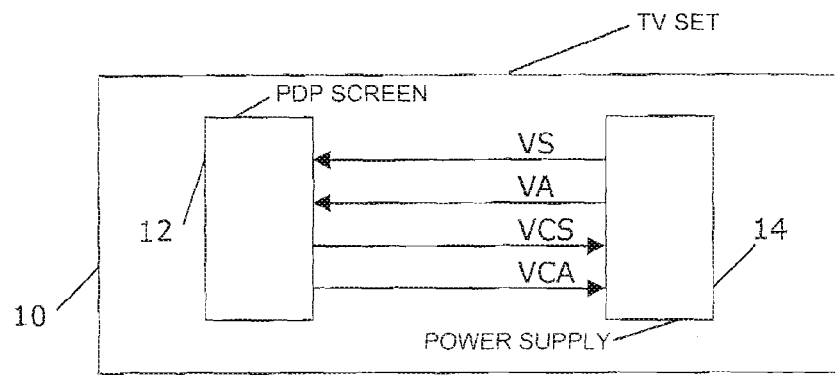
FIG. 1 shows a block schematic of an information display device including a load device and a power supply device.

In FIG. 1 is shown a block schematic of a display device according to the prior-art. The display device according to a preferred embodiment of the invention is a television set 10 having two separate entities, one being a load in the form of a PDP (plasma display panel) screen 12 separated from and connected to another entity in the form of a power supply device 14. The power supply device 14 can in a known way be connected to a power network in order to perform power conversion for supply to the PDP screen 12. The plasma display panel 12 requires accurate voltages like a sustain voltage VS and addressing voltage VA, which are used for energizing the screen. The power supply device 14 supplies these voltages via two lines. These voltages have to be very finely adjusted for a PDP, i.e. they should have small error margins, which are hard to obtain and maintain over the lifetime of a PDP. In order to receive the correct voltages, the PDP unit 12 sends control signals VCS and VCA for both these supply voltages VS and VA, respectively, to the power supply device 14, in order for it to pre-set the output voltages, which are in this embodiment the sustain voltage VS and the addressing voltage VA. These control signals VCS, VCA have up until now been provided as pre-set values by the PDP without any influence from the actual supply voltages VS and VA delivered to the PDP unit 12, i.e. in an open-loop system. The power supply device (14) has to supply the voltages VS and VA in dependence on the control signals VCS, VCA according to a formula, for example:

$VS=70V+10*VCS$ $VA=30V+20*VCA.$

So, when assembling for example in a television manufacturing facility a product comprising the PDP unit 12 and the power supply device 14, the output voltages VS, VA delivered by the device 14 have to be aligned accurately to a value obtained by measuring the voltage of the control signals VCS, VCA and substituting the measured voltage in above-mentioned corresponding formula.

Figure 2:
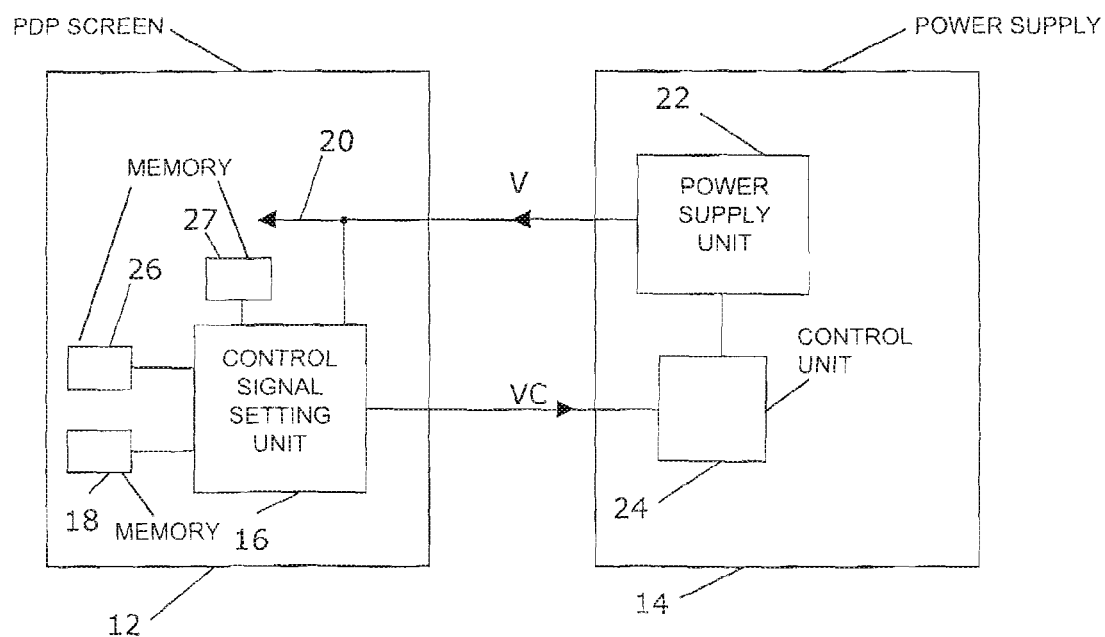
FIG. 2 shows a block schematic of parts of the load device and the power supply device connected to each other.

FIG. 2 shows a block schematic of the parts of the PDP and power supply device, which are relevant for understanding the present invention. For simplicity only one of the output voltages is shown, designated with a V. The voltages VS and VA are provided in the same way (whereby the formulas can be different as shown above), so it is only necessary to describe one here. In FIG. 2 the power supply device 14 is shown having a power delivery unit 22, which performs the actual power conversion. To this power delivery unit 22 is connected a control unit 24. The power delivery unit 22 is connected to the PDP 12 and delivers output voltage V. This output voltage is here used as an output parameter value, but other parameter values can be used, which will be described in relation to later embodiments of the invention. The PDP 12 includes a control signal setting unit 16, which in a first embodiment has an input which directly receives the output voltage level V from the power supply device 14. The control signal setting unit 16 is connected to a first memory 18, a second memory 26 and a third memory 27, the use of which will be described in more detail later. The control signal setting unit 16 is also connected to the control unit 24 of the power supply device for supplying a control signal VC.

In the open-loop system the power supply device has to deliver the output voltage V according to formula (taking the example of the sustain voltage VS):

$V=70\text{ Volt}+10*VC+E,$ where VC is the control signal, representing a reference value provided by the PDP manufacturer and normally corresponds to an optimal output voltage V which the PDP requires. In the formula above E is a maximum allowable error margin, which in a practical application is, for example, in the range of −2 to 2 volts. This error margin E has previously been hard to match for power supply devices, because the power supply device will always have some initial error and some drift over time due to changes in included components. Moreover ambient temperature and other operating conditions can influence the output voltage V.

The present invention has solved this problem in essence by providing a feedback loop such that the control signal VC delivered to the power supply device contains information about the delivered output voltage V while still using above mentioned formula.

In somewhat more detail the PDP 12 has a control unit 16 that measures the voltage V generated by the power supply device, and adjusts this voltage to the optimal output voltage by means of changing the control voltage VC. In this case the requirements of the adjustments of the power supply output voltages in the, for example, television factory can be less stringent or the adjustment can even be avoided. The control unit 16 can have an analogue or digital implementation.

In case of a digital implementation, during the manufacturing of a PDP an alignment takes place, for example, by using a reference power supply device, which is equivalent to the actual power supply device to which it later on will be connected. During this alignment the control signal VC is adjusted such that the reference power supply delivers the output voltage V corresponding to an optimal value for the PDP being aligned. The value of the control signal VC, resulting in an optimal output voltage V, is stored in the second memory 26. Moreover, the value of the optimal output voltage V (or a value derived from this optimal output voltage V) is stored in a third memory 27.

Upon initial connection of the PDP with the power supply device 14, for instance in a factory where television sets are assembled, the thus stored value in the second memory 26 is used as a starting value for the control signal VC for the power supply device 14. In this way the power supply device 14 delivers from the start onwards approximately the optimal output voltage V to the PDP. Next, the control signal setting unit 16 samples the control signal VC. A time constant, determining the speed of regulation of the feedback-loop, can be set to a value smaller than in normal operation. This allows a faster response, so the feedback-loop reaches faster a final value of the output voltage V and the corresponding control signal VC. The feedback-loop will change the output voltage V until it substantially matches the value of the optimal output voltage stored in the third memory 27. If the gain of the feedback loop is high enough, there is no further alignment necessary of the power supply device 14. However, if the loop gain is not high enough to ensure that the output voltage V remains under all circumstances within the allowable error margins, or if the power supply device 14 could run out of its operating range, then an alignment has to take place. The resulting final value of the control signal VC, found with or without averaging over a number of samples, is stored in the first memory 18. Alternatively, only the deviation of the final value from the value stored in the second memory 26 can be stored in the first memory 18. When the television is turned on thereafter, the value in the first memory 18 is used as starting value for the control signal VC. During normal operation the control signal VC is regularly monitored, and the average value of the most recently monitored values (which result in an output voltage V corresponding to the optimal value stored in the third memory 27), is stored in the first memory 18. So, the power supply device 14 will, at a next time the television is switched on, immediately supply the correct output voltage V.

Figure 3:
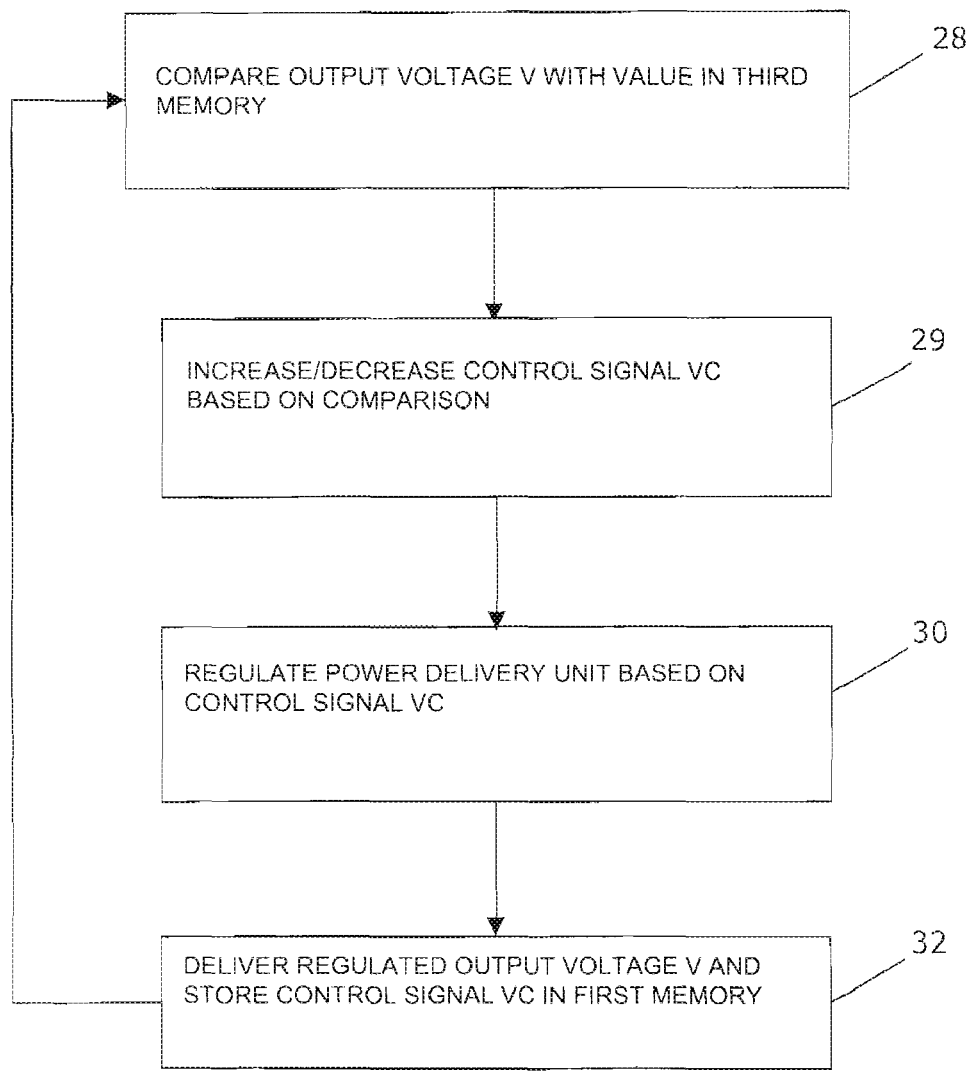
FIG. 3 shows a flow chart of a method according to the invention.

With reference also to FIG. 3, which shows a flow chart of a method according to the invention, the method will be further described. The flow chart indicates the method of regulating the output voltage V during normal operation, so after the assembly and alignment of, for example, the television set. What happens is that the control signal setting unit 16 takes a stored reference or control value from memory 18. The control signal setting unit 16 also receives a value equal to or derived from the output voltage V. The control signal setting unit 16 then compares this received value with the value in the third memory 27, step 28. The result of the comparison is used to increase or decrease the control signal VC to the control unit 24 of the power supply device, step 29. The control signal VC thus includes information about the output voltage V. The control unit 24 of the power supply device then regulates the power delivery unit 22 based on the control signal VC, step 30. This is done by implementing the equation above. The error on the output voltage V is now reduced as the control setting unit 16 adjusts VC until the power delivery unit 22 delivers the desired output voltage V. The power delivery unit 22 then delivers the regulated output voltage V and the control setting unit 16 overwrites the control value in memory 18 with the resulting value of the control signal VC, step 32. Because of this feed back and the formula used, the error margins allowed for the power delivery unit are much more relaxed than previously. The remaining error when applying feedback can be reduced to a negligible amount, depending on the accuracy of the used components.

In addition, the control signal setting unit 16 could be adapted to gradually change the control signal VC from a start value to the value stored in first memory 18. In this way undesired transients (like overshoots) of the output voltage V can avoided.

Figure 4:
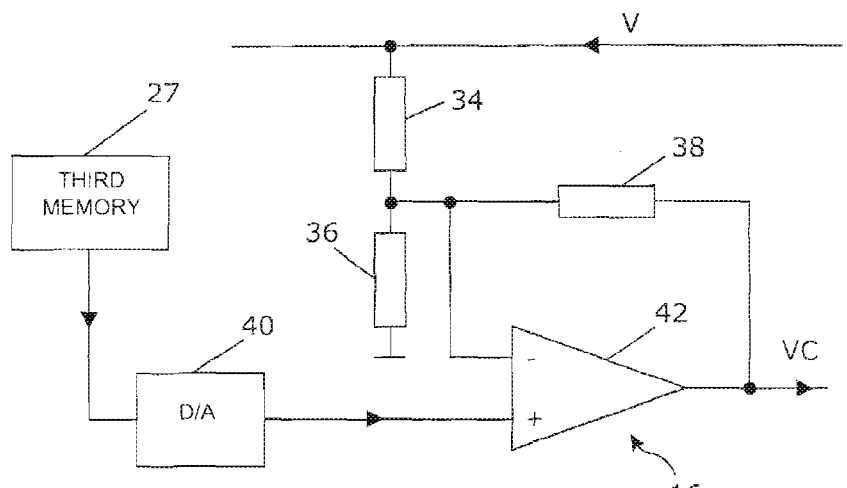
FIGS. 4-6 show circuit diagrams of some possible realizations of a load device and a power supply device according to the invention.

A number of different embodiments of the present invention will now be described. Turning first to FIG. 4, there is shown an analog solution to output voltage control.

FIG. 4 shows a circuit diagram of an analogue variant of the control signal setting unit according to the present invention connected to the third memory 27. The unit includes a first resistor 34, which on one terminal receives the output voltage V from the power supply device 14 and which is connected to a four way junction with it's other terminal. A second resistor 36 is connected between the four-way junction and ground. The negative input of an operational amplifier 42 is also connected to the four-way junction, as is a first terminal of a third resistor 38. A second terminal of the third resistor 38 is connected to the output of the operational amplifier 42. The third memory 27 is connected to the positive input of the operational amplifier via a D/A converter 40. The operational amplifier 42 is one of many possible versions of a comparing device, which is used in the invention. Finally the output of the operational amplifier 42 supplies the control signal VC, which is supplied to the power supply device 14.

The circuit of FIG. 4 works in the following way. The output voltage V is divided by the first and second resistors 34 and 36 and compared to the value from third memory 27 by the operational amplifier 42. The value is here a digital value converted to an analogue reference voltage by the D/A converter 40 and input to the operational amplifier 42. The loop gain of this system (for DC) will be equal to the dividing of the third resistor value with the first resistor value multiplied by ten, again taking as example the formula for the sustain voltage VS, so if the first and third resistors 34 an 38 are chosen to have the same value, there will be a loop gain of 10. Any error E in the output voltage V will therefore be attenuated by a factor of 11 due to the feedback, which makes the error margin requirements relax considerably. Of course, by choosing other resistor values the loop gain can be given any other value.

Figure 5:
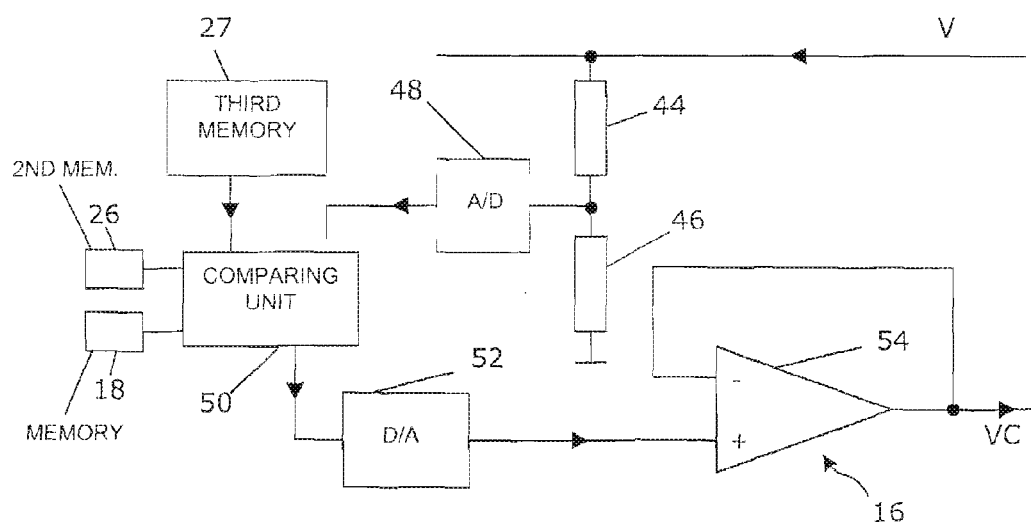

FIG. 5 shows a first digital embodiment of the control signal setting unit of FIG. 2, which is also a preferred embodiment of the present invention. Here there is a first resistor 44, which on one terminal receives the output voltage V from the power supply device 14 and which is connected in series with a second resistor 46, which in turn is connected to ground. The connection point between the first and second resistor 44, 46 is connected to an A/D converter 48, which in turn is connected to a first input of a comparing unit 50. The third memory 27 is connected to a second input of the comparing unit 50, which has an output connected to the input of a D/A converter 52, whose output is connected to the positive input of a buffer amplifier 54. The output of the buffer amplifier 54 is connected to the input of the control unit 24 of the power supply device 14 and to it's own negative input. The output of the buffer amplifier 54 is the control signal VC. In the control signal setting unit 16, the output voltage V is divided by the two resistors 44, 46. The divided value is then converted to a digital value in A/D converter 48, which is compared with the optimal value (corresponding to the optimal output voltage V for the load 12) in the comparing unit 50. The optimal value is stored as a third reference value in the third memory 27, when the load 12 is manufactured.

The difference resulting from the comparison is used to adapt the control signal VC in the comparing unit 50 before being D/A converted in the D/A converter 52 and supplied to the control unit 24 via buffer amplifier 54. This embodiment thus achieves the same result as the analogue circuit of FIG. 4. If the D/A converter 52 is capable of driving the control unit 24 directly, the buffer amplifier 54 can be omitted. In that case the output of D/A converter delivers directly the control signal VC. Furthermore, the second memory 26 is used to store as a second reference value the value of the control signal VC which is present when the optimal output voltage V is supplied by the reference power supply device. This second reference value is used as starting value for the control signal VC, when the load 12 and power supply device 14 are switched on for the first time. During subsequent operation the control signal VC is regularly sampled and deviations from the second reference value are stored as first reference value in memory 18. At a next switching on of the power supply device 14 and load 12 the initial value for the control signal VC is the sum of the first and second reference value.

Figure 6:
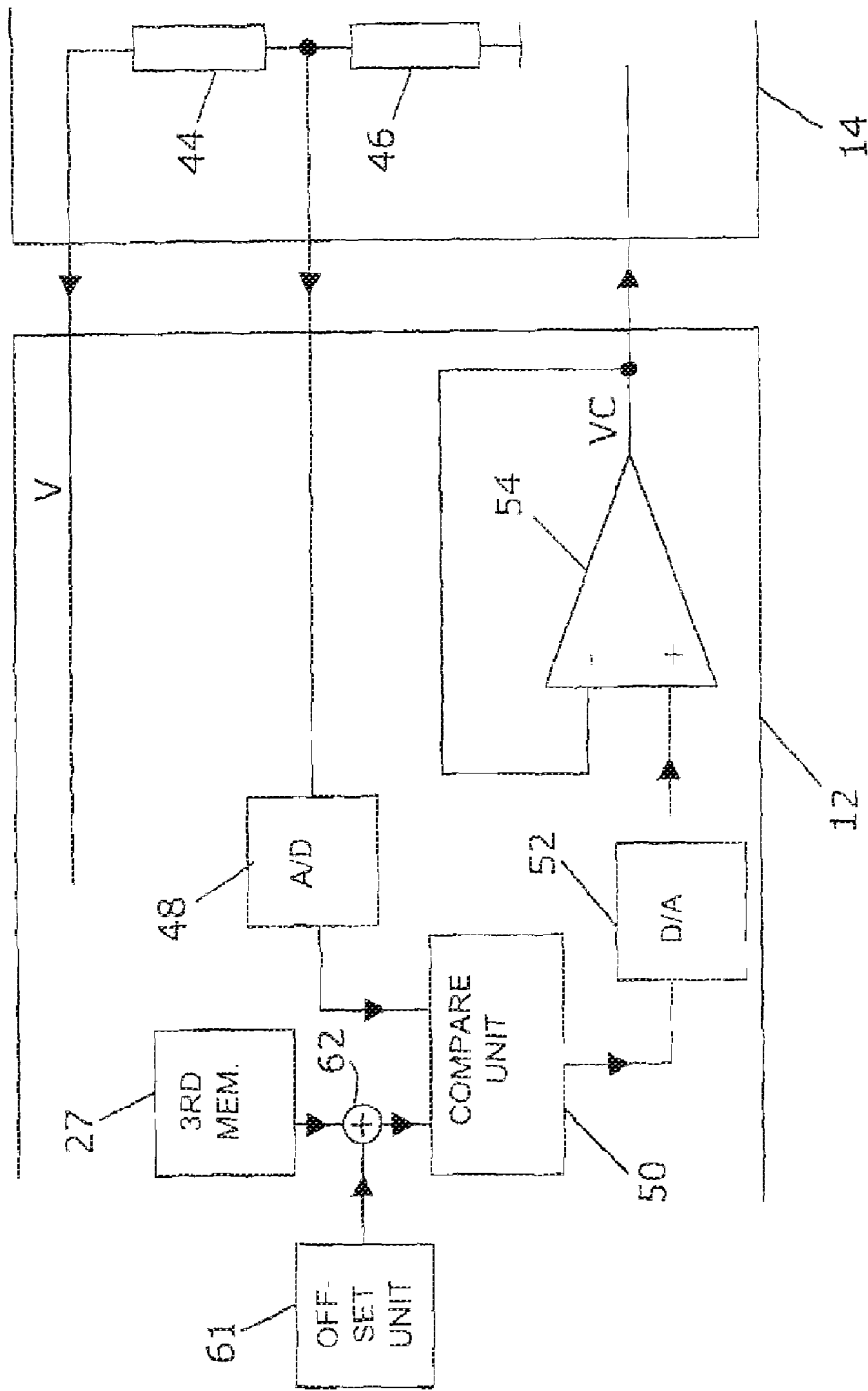

FIG. 6 shows yet another digital solution quite similar to the one in FIG. 5. The different components have here received the same reference numerals as the components in FIG. 5, since they actually accomplish the same things. The only difference here is that the first and second resistors 44, 46 have been moved from the PDP 12 to the power supply device 14. This solution however requires a separate line or connection for this divided output voltage level. Moreover, in this configuration, the accuracy of the first and second resistors 44, 46 influence the accuracy of the output voltage V. To minimize the impact of inaccuracy of the resistive divider formed by the first and second resistors 44, 46 an offset may be introduced. FIG. 6 shows an off-set unit 61, which can be adjusted to supply a desired off-set voltage to adder 62. In adder 62, this off-set voltage is added to the third reference voltage. Upon connection of the PDP 12 and the power supply device 14, the off-set voltage can be adjusted to compensate for a deviation from a nominal value of the resistive divider.

There has thus been described a method and device for relaxing the severe error margins constraints required by some load devices.

What was described here was the regulation of one of the output voltages V, which for example, could be the sustain voltage VS. In the same way the address voltage VA can be regulated.

The comparing unit is preferably provided in the form of a microprocessor unit (MPU), which can execute instructions and calculations including multiplying. The first, second and third memory can be separate memories or can be combined in one device.

The present invention can be provided as an additional optional system provided together with a fixed value system, i.e. a system where the load delivers two different control voltages VCS, VCA, to be used for pre-setting sustain and addressing voltages without feedback by applying the mentioned formulas. In this case a television set manufacturer can choose between the two different systems, i.e. a feedback or non-feedback system, and select the one which suits him best.

The present invention has several advantages. A first is that it enables the provision of a cheaper power supply because of the less stringent error margins. A second advantage is that a more accurate output voltage is delivered, which results in maintaining an optimal picture quality for the PDP display during the lifetime of the product. A third advantage is that less or simpler adjustments are necessary in the factory where a device like a TV including a PDP display is assembled.

It should be realized that the invention is not limited to television sets or PDPs, but is applicable in any circumstances, where there is a load having severe voltage or current delivery requirements. Depending on the load requirements other parameters than the output voltage, for example, an output current could be controlled via a feedback-loop. Consequently the invention is only to be limited by the following claims.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of regulating an output parameter value of a power supply device coupled to a separate load device, said separate load device demanding at least one certain parameter value from the power supply device, the method comprising the steps of:
   delivering a control signal from the load device to the power supply device;
   regulating the output parameter value in the power supply device in dependence on the delivered control signal; and
   delivering the regulated output parameter value to the load device,
   wherein the control signal includes information relating to the output parameter value, so that a feedback loop is provided between the load device and the power supply device, wherein said method further comprises the steps of:
   obtaining a first reference value corresponding to the at least one certain parameter value demanded by the load device;
   comparing the delivered output parameter value with the first reference value; and
   adjusting and delivering the control signal in dependence on the comparison.

2. The method as claimed in claim 1, wherein said method further comprises the step of:
   multiplying the difference between the output parameter value and the first reference value, and delivering the multiplied difference as the control signal.

3. The method as claimed in claim 1, wherein said method further comprises the steps of:
   connecting the load device to a reference power supply device before it is coupled to the power supply device;
   adjusting the control signal until the reference power supply device delivers the output parameter value demanded by the load device;
   sampling a value of the control signal, while the reference power supply device delivers the demanded output parameter value; and
   storing the sampled value of the control signal as a second reference value in the load device.

4. The method as claimed in claim 3, wherein said method further comprises the step of:
   using the second reference value as an initial value of the control signal when switching on the load device and the power supply device for the first time.

5. The method as claimed in claim 3, wherein said method further comprises the steps of:
   sampling a deviation of the control signal from the second reference value, while the power supply device delivers the demanded output parameter value;
   storing the deviation of the control signal as a third reference value; and
   using a sum of the second and third reference values as an initial value of the control signal, during subsequent switching-on operations.

6. The method as claimed in claim 5, wherein after switching on, the control signal is adapted gradually until the initial value is reached whereby overshoots of the output parameter value are avoided.

7. A load device demanding at least one certain output parameter value from a separate power supply device, said load device comprising:

a control signal setting unit for receiving information relating to an output parameter value delivered by the power supply device, said control signal setting unit being connectable to a control unit of the power supply device, for delivering a control signal for use in regulating the output parameter value of the power supply, such that the control signal setting unit is part of a feedback loop, wherein the control signal setting unit comprises a comparing unit for comparing the delivered output parameter value with a reference value stored in the load device in order to provide the control signal.

8. The load device as claimed in claim 7, wherein the comparing unit includes an A/D converter for converting a signal corresponding to the output parameter value to a digital signal, a subtracting unit for subtracting the digital signal from a digital reference stored in a memory thereby forming a difference signal, and a D/A converter for converting the thus obtained difference signal to an analog value, said analog value being the control signal.

9. A load device demanding at least one certain output parameter value from a separate power supply device, said load device comprising:

a control signal setting unit for receiving information relating to an output parameter value delivered by the power supply device, said control signal setting unit being connectable to a control unit of the power supply device, for delivering a control signal for use in regulating the output parameter value of the power supply, such that the control signal setting unit is part of a feedback loop, wherein the load device is a plasma display panel.

* * * * *